C. H. STOUT.
OPTICAL INSTRUMENT.
APPLICATION FILED APR. 19, 1916.

1,226,026.

Patented May 15, 1917.

Inventor:
Charles H. Stout.
by Davis & Simms
his attorneys.

UNITED STATES PATENT OFFICE.

CHARLES H. STOUT, OF ROCHESTER, NEW YORK, ASSIGNOR TO CROWN OPTICAL COMPANY, OF ROCHESTER, NEW YORK, A CORPORATION.

OPTICAL INSTRUMENT.

1,226,026.  Specification of Letters Patent.  Patented May 15, 1917.

Application filed April 19, 1916. Serial No. 92,283.

*To all whom it may concern:*

Be it known that I, CHARLES H. STOUT, a citizen of the United States, and resident of Rochester, in the county of Monroe and State of New York, have invented certain new and useful Improvements in Optical Instruments, of which the following is a specification.

The present invention relates to optical instruments and more particularly to the type employing prisms for reflecting the image from the objective to the eyepiece, the invention being illustrated in a prism binocular of a well known type. An object of the invention is to provide for securing prisms to their seats in such a manner that they will be firmly held in place while at the same time being adjustable in the plane of their seats without exerting any pressure on the prisms tending to distort the same. Another object of the invention is to cover the reflecting faces of the prism to guard against the escape of light, while at the same time providing space about the reflecting faces so that any moisture collecting on said faces will readily evaporate. Still another object of the invention is to provide a single device coöperating with the two angularly arranged faces of the prism and engaged by two separate adjusting screws.

To these and other ends, the invention consists of certain parts and combinations of parts all of which will be hereinafter described, the novel features being pointed out in the appended claims.

In the drawings:—

Figure 1:
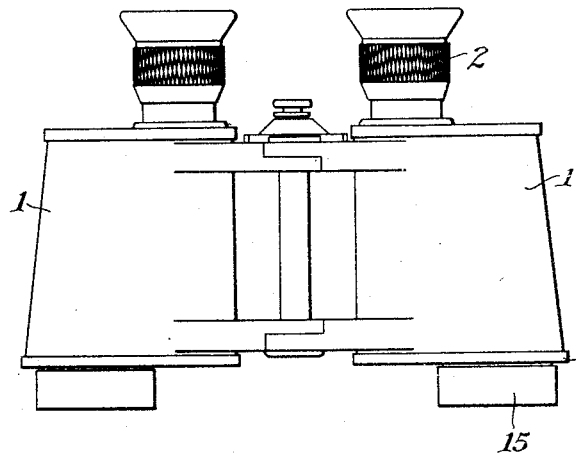
Figure 1 is a plan view of a binocular telescope constructed in accordance with the present invention.

Binocular telescopes comprise usually two casing members 1 hinged together and carrying eyepieces 2 and objectives 3. Between the eyepieces two prisms 4 are usually arranged, only one of which in the present instance is shown supported on a seat 5.

The present invention contemplates a new method of securing the reflector prisms to their seats. According to this invention, a single device coöperates with the two angularly arranged faces of the prism 4 and is preferably in the form of a hood or cover 6 which incloses both reflecting faces of the prism and extends around the corner between the said faces. This hood or cover is preferably formed from sheet metal pressed to provide two chambers 6ª in proximity to the reflecting faces and also surrounding flanges 7 bearing against the prism near the edges of the reflecting faces. The chamber 6ª permits any moisture to evaporate readily without causing any stains to be produced on the reflecting surfaces.

The adjusting devices 8 are preferably in the form of screws operable from the exterior of the casing 1 and lying in alinement and parallel with the plane of the seat 5. These screws have tapered ends 9 which operate in depressions or grooves 10 in the cover or hood. This coöperation of the screws with the walls of the grooves 10 tends to prevent the shifting of the hood on the prism and at the same time it is possible to adjust the prism in the direction of the longitudinal axis of the seat 5, in order to obtain proper optical relation between the eyepiece and the objective.

Another feature of this invention is the manner of securing the objective to the casing. In prism binoculars it is customary to form the casing 1 of aluminum and to connect the objective mounting thereto by screw threads. As the objective mounting is removed from time to time, the screw threads in the aluminum wear out and, in addition, the proper optical relation between the eyepiece and objective is destroyed, due to the fact that the objective is ordinarily turned until it lies in firm abutment with the cover of the casing, said cover not being accurately fitted. According to this invention, the objective mounting connects with a separate brass sleeve that is anchored in the aluminum casing, and this sleeve has its end acting against the shoulder on the mounting so as to properly define the relation between the objective and the eyepiece, the objective being removable from the brass sleeve without injuring the casing of the instrument.

Figure 2:
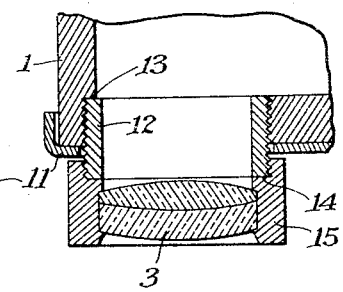
Fig. 2 is a sectional view showing the manner of connecting the objective to the casing of the telescope.
Figure 3:
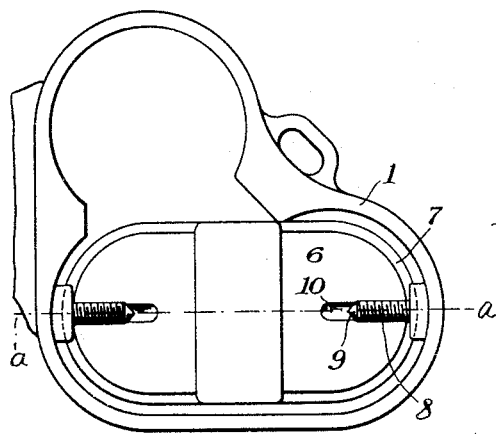
Fig. 3 is a view of the instrument showing the interior thereof as viewed from the top after the removal of the eyepiece and cover plate.
Figure 4:
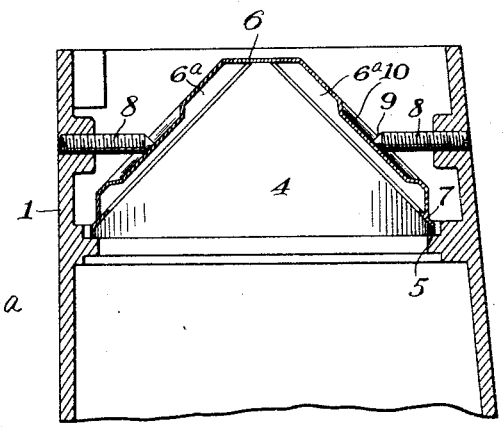
Fig. 4 is a section on the line *a—a*, Fig. 3.

Referring to Fig. 2, 11 indicates the cover and 12 the separate brass tube or bushing which has screw-threaded engagement with the aluminum casing 1 and extends loosely through the cover member 11. This tube is of uniform diameter and has one end abutting a shoulder 13 on the casing, while the other end is engaged by a shoulder 14 within the objective mounting 15, said mounting having internal threads which engage the external threads on the brass sleeve or tube 12. By this arrangement, the objective mounting 15 may be removed readily without removing the sleeve 12 which engages the aluminum casing 1. The sleeve 12 forms an abutment which clearly defines the optical position of the objective mounting so that the latter does not have to depend upon the cover member 11 for an abutment.

It will be noted that the cover for the prism prevents pressure being applied to the prism by the adjusting devices, at such points that said adjusting devices would tend to distort the prism, the flanges 7 distributing the strain equally throughout the prism. The cover also acts as a light guard for the prism to prevent the loss of light and, at the same time, provides space about the prism for the evaporation of moisture so that no stains will occur on the prism from the sweating of the latter. The adjusting screws operate in a manner to hold the prism to its seat and at the same time to effect longitudinal adjustment thereof. The coöperation between the adjusting devices and the cover or hood prevents lateral movement of the hood. The objective may be removed and refitted without destroying the optical relation between it and an eyepiece and without injury to the telescope casing, and the cover of the casing may be removed without removing the brass sleeve.

What I claim as my invention and desire to secure by Letters Patent is:—

1. In combination in an optical instrument, a seat, a prism arranged on the seat and having two angularly arranged faces, a device bearing on said prism throughout the lengths of both faces, and having a space next to the prism for evaporating any moisture on the prism, and adjusting devices bearing against the first named device to hold the prism to its seat and to shift the prism on its seat in the plane of said seat.

2. In combination in an optical instrument, a seat, a prism arranged on the seat and having two angularly-arranged faces, and a cover for the prism provided with portions engaging the angularly-arranged faces near opposite sides of the latter and having a space between such engaging portions next to the prism for evaporating any moisture on the prism.

3. In combination in an optical instrument, a seat, a prism arranged on the seat and having a pair of angularly arranged faces, a cover for both faces formed with two grooves, and two adjusting devices bearing in the grooves and acting to hold the cover to the prism and the latter to its seat.

4. In combination in an optical instrument, a seat, a prism arranged on the seat and having a pair of angularly arranged faces, a cover member bearing against both faces throughout their lengths and extending about the corner of the prism, said cover member providing an evaporating space in proximity to the faces of the prism and having two grooves, and two adjusting screws having pointed ends operating in said grooves to hold the cover member to the prism and the latter to its seat.

CHARLES H. STOUT.

Copies of this patent may be obtained for five cents each, by addressing the "Commissioner of Patents, Washington, D. C."